Figure 1:
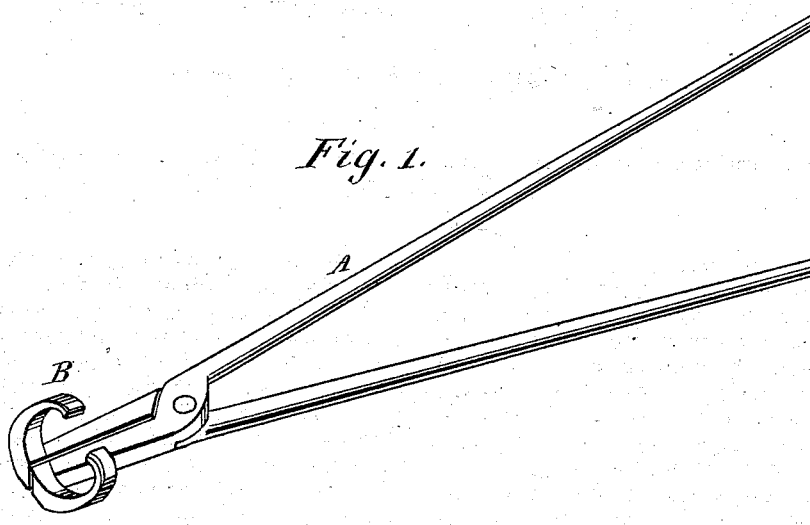
Figure 2:
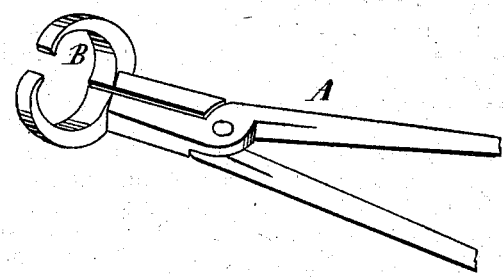

G. G. McMANIS.
Hog-Catchers.

No. 152,667.                     Patented June 30, 1874.

Witnesses                         Inventor

UNITED STATES PATENT OFFICE.

GEORGE G. McMANIS, OF PRINCETON, ILLINOIS.

IMPROVEMENT IN HOG-CATCHERS.

Specification forming part of Letters Patent No. 152,667, dated June 30, 1874; application filed May 14, 1874.

*To all whom it may concern:*

Be it known that I, GEORGE G. McMANIS, of Princeton, in the county of Bureau and State of Illinois, have invented a new and useful Improvement in Hog-Catchers; and I do hereby declare that the following is a full and exact description of the same, reference being had to the accompanying drawings and to the letters of reference marked thereon.

The object I have in view is an improvement in hog-catchers, whereby the same may be more conveniently and efficiently used; and my invention therein consists in the novel construction of the instrument, in the application of which the effective result is attained.

To enable those skilled in the art to make and use my improvement, I proceed to describe the same in connection with the drawings, which represent perspective views of the same.

On each nip-end of a pair of tongs, A, which are pivoted to give great leverage, is wrought a C-shaped hook, B, which hooks stand in the same transverse plane, at an angle somewhat greater than a right angle with the plane of the tongs. The hooks B bend toward each other, but do not meet, and conform in shape to the upper jaw of a hog, which they are intended to inclose when used. They will the more readily conform to a hog's upper jaw on account of their standing in a plane which is not quite perpendicular to that of the tongs.

To use the hog-catcher it is necessary to approach the animal from the rear, and, laying the tongs over its face, seize it with the hooks around the snout or upper jaw with sufficient pressure to keep the hooks from slipping. In this situation the hog will make no attempt to escape, and any operation desired can be performed. It presents the further advantage that the animal can be caught without touching the hands to it, and can be held and controlled completely.

I do not claim the invention of catching hogs by the leg, or by any other part except the upper jaw, from above, as by catching by any other part this animal will not stand still, which is the essential part of my invention.

Having thus described my implement, what I claim as new is—

The tongs constructed as herein described, and adapted for catching a hog from above, upon, and around the upper jaw, and holding him, substantially as set forth.

This specification signed and witnessed this 11th day of May, 1874.

GEORGE G. McMANIS.

Witnesses:
 THOS. J. HENDERSON,
 H. M. TRIMBLE.